United States Patent
Hodge et al.

(10) Patent No.: US 7,801,640 B1
(45) Date of Patent: *Sep. 21, 2010

(54) CONTINUOUS ITEM PICKING IN A DISTRIBUTION CENTER USING COORDINATED ITEM PICKING PERIODS

(75) Inventors: Dennis R. Hodge, Bellevue, WA (US); Donald L. Kaufman, Kirkland, WA (US); Andrew C. McLenon, Independence, KS (US); Jonas M. Carson, Seattle, WA (US); Jonathan J. Shakes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 1033 days.

This patent is subject to a terminal disclaimer.

(21) Appl. No.: 11/354,747

(22) Filed: Feb. 15, 2006

Related U.S. Application Data

(63) Continuation of application No. 10/664,600, filed on Sep. 19, 2003, now Pat. No. 7,031,801.

(51) Int. Cl.
  *G06F 7/00* (2006.01)
(52) U.S. Cl. .................... 700/213; 700/216
(58) Field of Classification Search ........... 700/213, 700/226, 214, 229
See application file for complete search history.

(56) References Cited

U.S. PATENT DOCUMENTS

| | | | |
|---|---|---|---|
| 4,958,292 A | 9/1990 | Kaneko et al. | |
| 5,270,157 A | 12/1993 | Bell et al. | |
| 5,395,206 A | 3/1995 | Cerny, Jr. | |
| 5,844,806 A | 12/1998 | Shibano | |
| 5,875,434 A * | 2/1999 | Matsuoka et al. | 705/28 |
| 5,934,413 A | 8/1999 | Konig et al. | |
| 6,061,887 A | 5/2000 | Kawasaki et al. | |
| 6,425,226 B1 | 7/2002 | Kirschner | |
| 7,031,801 B1 | 4/2006 | Hodge et al. | |
| 7,243,001 B2 * | 7/2007 | Janert et al. | 700/214 |
| 2004/0253082 A1 * | 12/2004 | Mathys et al. | 414/280 |

* cited by examiner

*Primary Examiner*—Gene Crawford
*Assistant Examiner*—Ramya Prakasam
(74) *Attorney, Agent, or Firm*—Robert C Kowert; Meyertons, Hood, Kivlin, Kowert & Goetzel, P.C.

(57) ABSTRACT

A facility for scheduling the picking of a plurality of items specified for an item shipment is described. When a first-picked item of the plurality is picked, the facility selects a first period of time of a target length during which the first-picked item is expected to arrive at a sorting machine. For each of the items specified for the item shipment other than the first-picked item, the facility designates a picking period for the item that, when shifted forward in time by an amount of time the item will take to arrive at the sorting machine once picked, falls completely within the first period of time.

15 Claims, 9 Drawing Sheets

CONTINUOUS ITEM PICKING IN A DISTRIBUTION CENTER USING COORDINATED ITEM PICKING PERIODS

CROSS-REFERENCE TO RELATED APPLICATION(s)

This application is a continuation of U.S. patent application Ser. No. 10/664,600, entitled "CONTINUOUS ITEM PICKING IN A DISTRIBUTION CENTER USING COORDINATED ITEM PICKING PERIODS," filed on Sep. 19, 2003, now U.S. Pat. No. 7,031,801 which is incorporated herein by reference in its entirety.

TECHNICAL FIELD

The present invention is directed to the field of operational logistics, such as warehouse operations control systems.

BACKGROUND

In a variety of business scenarios, it can be important to collect heterogeneous groups of items. As one example, it can be important to items specified in a remotely-placed order for delivery. As an alternative to purchasing merchandise in person at a physical store, shoppers may also place orders remotely for merchandise to be delivered. Such remote orders may be placed by a variety of means, such as by making a telephone call to a merchant, or interacting with a merchant's web site.

An order generally identifies one or more ordered items, and specifies delivery information for use in addressing and shipping one or more packages containing the items identified in the order. For some orders, all of the items in the order are shipped in a single shipment. In some cases, however, the items in a single order are divided into two or more separate shipments, such as for orders containing items not all available for shipment from the same distribution center at the same time.

Each shipment is typically delivered from a single distribution center. In a distribution center, items are "picked" to use in fulfilling shipments to be delivered from that distribution center—that is, they are manually removed from storage locations where they reside, such as particular bins or shelves. After being picked, items are conveyed to an assembly point where the items needed for each shipment are collected. In some cases, a sorting machine collects the items needed for each shipment. A typical sorting machine has a number of bins that are each used to collect the items for a single shipment. Accordingly, at any given time, the sorting machine may be collecting items for up to a number of shipments equal to the number of bins. After the sorting machine collects the items needed for a given shipment, the sorting machine discharges the items for packing of the shipment, such as into one or more boxes.

Conventionally, shipments are picked in batches whose size was equal to the number of sorting machine bins. At the starting time for a batch, all pickers are sent out with a list of items to pick during that batch. Each picker picks the items on his or her list, then waits for the current batch to conclude and the next batch to start, at which time all pickers receive a new list of items to pick.

Using this approach, the sorting machine often operates with significant numbers of unused bins, and thus with significant unused capacity. Furthermore, pickers are sometimes blocked, waiting on the next batch to begin. This underutilization of the sorting machine is particularly acute near the beginning of batches, before significant numbers of items have begun to arrive at the sorting machine; near the end of batches, after a significant fraction of the shipments in the batch have been discharged; and between batches, when all of the shipments in the preceding batch have been discharged, and no items have been picked for shipments in the upcoming batch. As the processing capacity of many distribution centers—measured by number of shipments processed in a given time period—is materially constrained by the utilization rates of their sorting machines, such underutilization often prevents these distribution centers from reaching higher levels of productivity, despite a willingness to devote additional picking resources to their operation.

In view of this significant disadvantage of conventional approaches to picking items for inclusion in shipments, a new approach to picking items that more fully and evenly utilizes the capacity of sorting machines would have significant utility.

DETAILED DESCRIPTION

Figure 1:
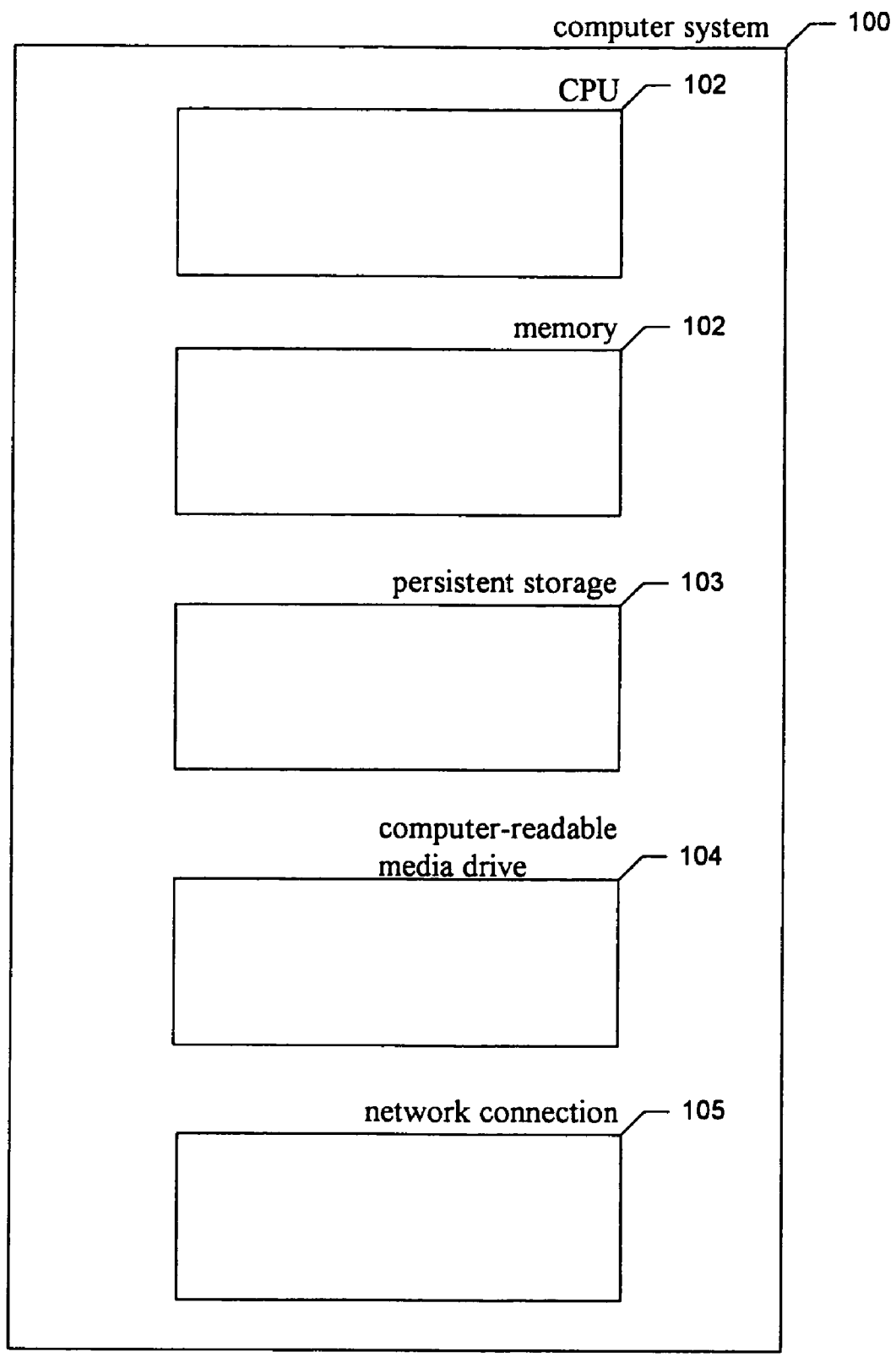
FIG. 1 is a block diagram showing some of the components typically incorporated in at least some of the computer systems and other devices on which the facility executes.

A software facility for continuously picking items in a distribution center for fulfilling item shipments ("the facility") is described. In some embodiments, the facility attributes coordinated item picking times to items within each shipment in order to minimize the amount of time that the shipment occupies an item aggregation unit at an item assembly point, such as a sorting machine chute. This in turn increases the number of shipments that the sorting machine can handle in a given period of time, and can increase the overall productivity of distribution centers in which the facility is used.

The period of time for which a chute is occupied by one or more items in a single shipment is referred to as the chute dwell period for that shipment. In some embodiments, the facility notes, for each shipment, when the first item for the shipment has been picked. This item is referred to as the shipment's "first-picked item." At this point, the facility anticipates that the chute dwell period for the shipment will begin at a future time calculated based upon an expected travel time for the first-picked item to a chute of the sorting machine. The facility adds a target chute dwell duration to the anticipated starting time for the chute dwell period to obtain an anticipated ending time for the chute dwell period. For each of the other items in the shipment ("successive items" for the shipment), the facility uses an expected travel time for this additional item to a sorting machine chute to calculate earliest and latest pick times for this item. These earliest and latest times demarcate a "pick window" for a successive item, such that, if the successive item is picked during its pick window, it is expected to arrive at a sorting machine chute during the chute dwell period. The facility uses these pick windows to schedule the picking of the successive items. In some embodiments, this process is performed when the first item becomes available to be picked, as opposed to when the first item is actually picked.

In some embodiments, the facility provides each picker with individualized real-time picking instructions, such as via wireless display devices. In some embodiments, the picking instructions include information identifying an item assigned to be picked and/or the location from which the item is to be picked. In some embodiments, the wireless display devices or other communication mechanisms are used by pickers to notify the facility that they have completed the picking of the assigned item.

In some embodiments, the facility schedules the picking of subsequent items using a system of priorities for subsequent items. In one such exemplary embodiment, the facility uses the following priority levels, in order of decreasing urgency: items whose latest pick time has already passed; items whose earliest pick time has passed, but whose latest pick time has not been reached; and items whose earliest pick time has not been reached. This approach enables the facility to recover from shipping interruptions that render late the picking of many subsequent items. In some embodiments, the facility is further able to recover from shipping interruptions by calculating the average of the times at the center of the pick window for each unpicked item. If this average is earlier than the present time, the facility compares the pick windows of the unpicked items to the average pick window center time rather than the current time in order to determine the priority levels for unpicked items.

In some embodiments, the facility selects additional shipments for picking based upon the state of the picking machine, such as by selecting additional shipments for picking only when at least a minimum number of chutes are unoccupied, or when at least a minimum number of chutes are expected to be unoccupied at a given future time. Various embodiments of the facility use various approaches to selecting first-picked items for picking, such as by selecting as the first-picked item in each order the item in the shipment having the longest expected travel time in order to provide time to schedule and complete the picking of the subsequent items in the shipment.

In various embodiments, anticipated travel time can include or exclude various scheduling components, including such scheduling components as time spent in the sorting machine reaching the appropriate chute; time spent on a system of conveyors that convey items to the sorting machine; picker travel time from item storage location to a conveyor; picker travel time from the location at which the picker receives picking instructions to the item storage location; time spent by the picker working on items that will travel together with a particular item, which may or may not be stored in the same place as the particular item; and variability allowances for any or all of these scheduling components. In some embodiments, the facility adjusts the pick windows for subsequent items in a shipment using updated information about the expected arrival time of the first-picked or subsequent items in the shipment, including actual arrival of these items at a sorter chute, or arrival at various points on the way to a sorter chute, such as various locations on conveyors that convey the items to a sorter chute.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 2:
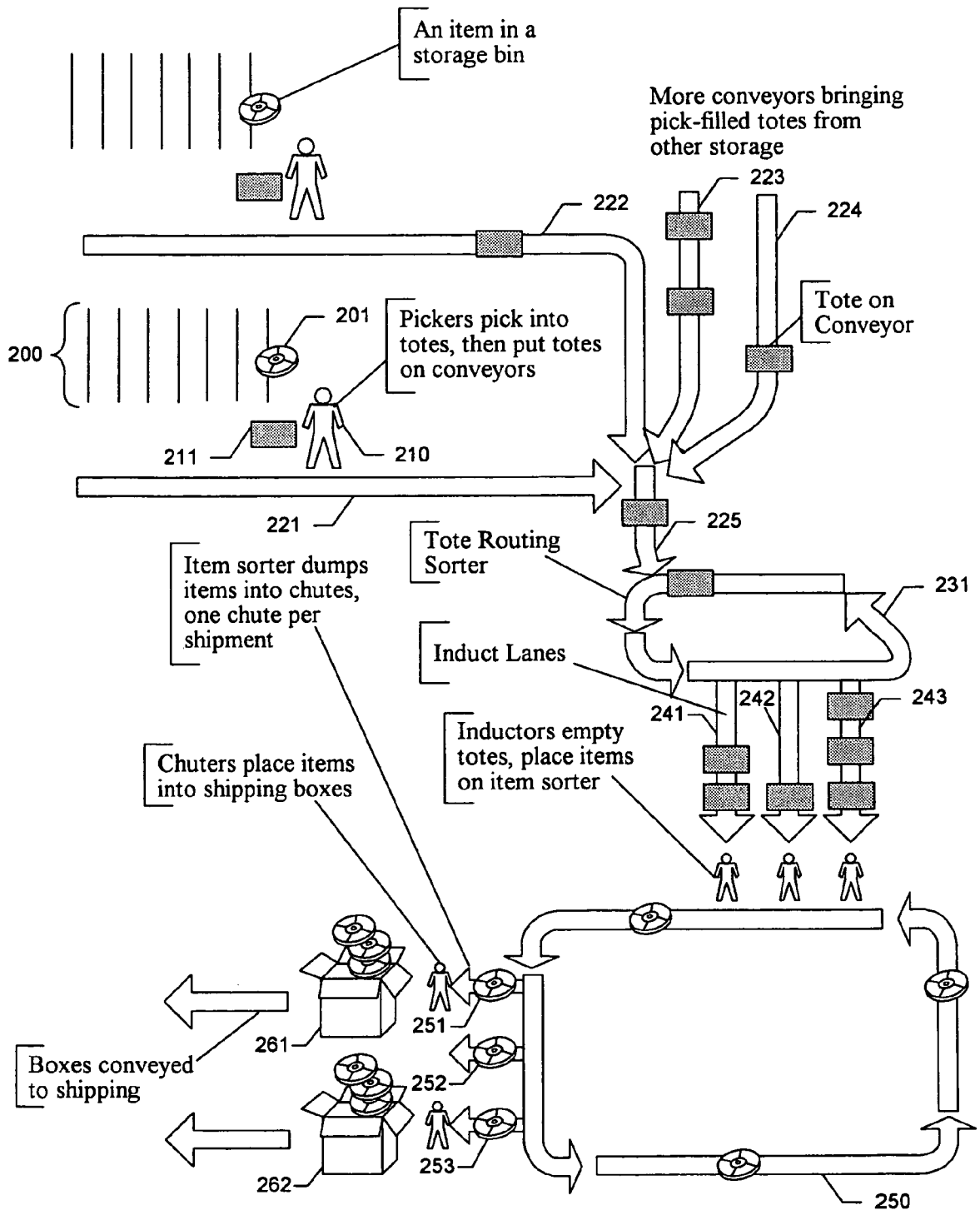
FIG. 2 is a schematic drawing showing a typical distribution center in which the facility operates.

FIG. 2 is a schematic drawing showing a typical distribution center in which the facility operates. While a distribution center having particular elements arranged in a particular layout is shown in FIG. 2, those skilled in the art will appreciate that the facility may readily be used in distribution centers having other elements and/or layouts.

FIG. 2 shows items, such as item 201, that initially reside in storage areas, such as storage area 200. In some embodiments, items reside in storage bins. In response to picking instructions issued by the facility, pickers pick items by locating the items in the storage area and causing them to be conveyed to a sorting machine 250. In some embodiments, the pickers pick one item at a time; in other embodiments, the pickers pick two or more items at a time. In some embodiments, the pickers place picked items in portable containers 211 called totes, then place the totes on a conveyor belt, such as conveyor belts 221-225. In other embodiments, totes are not used, and items are conveyed to the sorting machine individually. In some embodiments, such conveyor belts carry the items all the way to the item sorter 250. In other embodiments, the conveyors carry the items in totes to a tote routing sorter 231, which sorts the totes onto induct lanes, such as induct lanes 241-243. Totes in the induct lanes are emptied of their items, which are placed on the item sorter 250. Items on the item sorter 250 are directed to sorter chutes, such as sorter chutes 251-253. In some embodiments, for a particular item on the item sorter 250, if the item is the first item from its order to be placed in a sorter chute, then the item is placed in an empty sorter chute containing no items, else the item is placed in a sorter chute containing one or more items picked for its shipment. Once a particular sorter chute contains all of the items of a shipment, the shipment is deemed completed, and its items are discharged, or otherwise removed from the sorter chute, to be packed for shipment. For example, the items may be packed into boxes such as boxes 261 and 262 for shipment.

Figure 3:
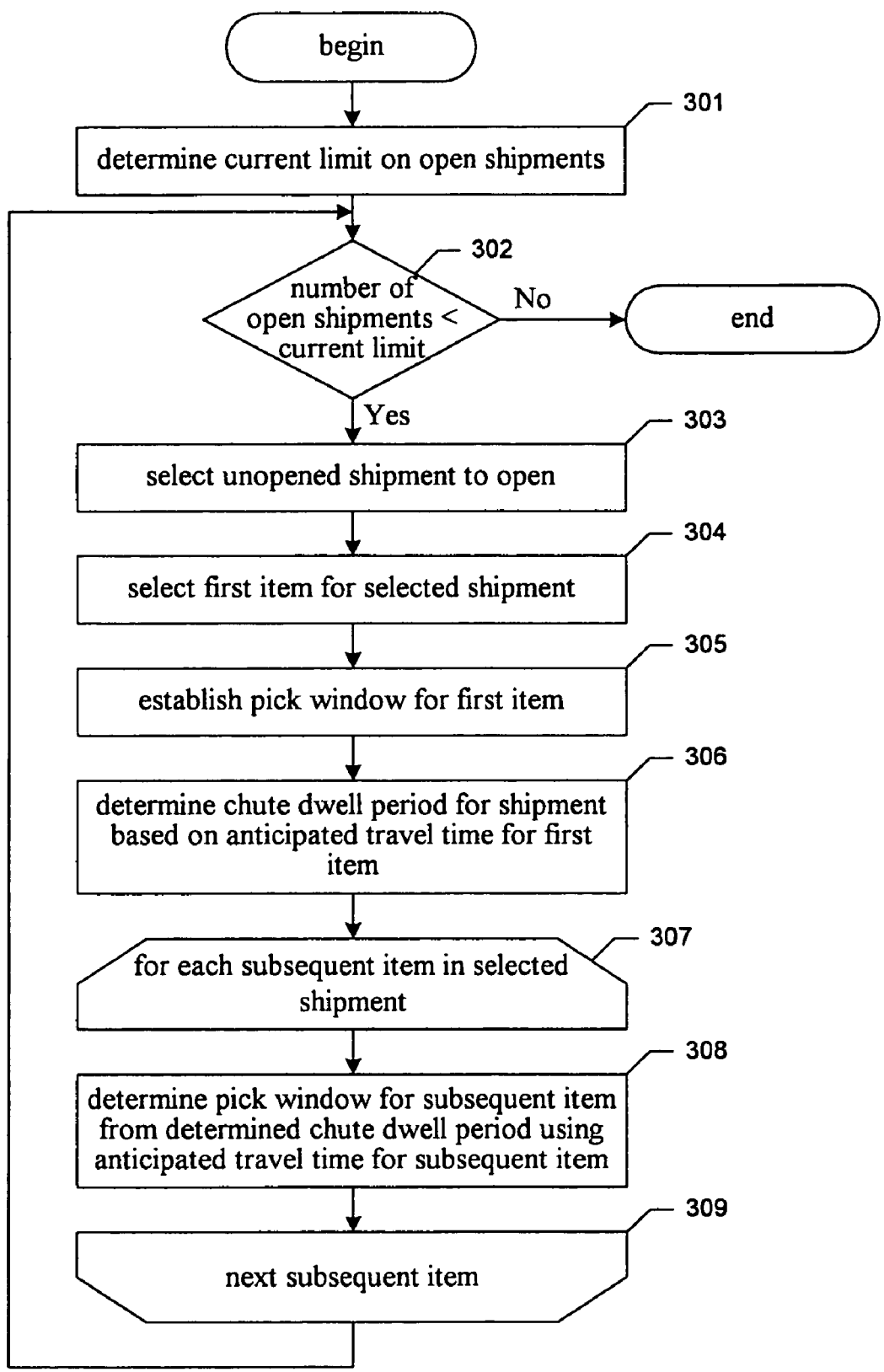
FIG. 3 is a flow diagram showing steps typically performed by the facility to open additional shipments for picking.

FIG. 3 is a flow diagram showing steps typically performed by the facility to open additional shipments for picking, enabling the items of the opened shipments to be packed. These steps are typically performed by the facility in response to each event that could cause the current number of open shipments to fall below a current limit on the number of open shipments; that is, any event that could either decrease the number of open shipments (e.g., completing a shipment), or events that could increase the current limit on open shipments (e.g., adding the services of one or more additional pickers to those already at work).

In step 301, the facility determines the current limit on open shipments. In some embodiments, this involves determining the current value of a dynamic limit based upon the level of picking resources presently available, and comparing that dynamic limit to a static limit based upon the number of chutes that are available in the sorting machine. The dynamic limit is typically determined by multiplying a measure of the current picking resources, such as the number of pickers presently at work, by a per-picker allowance, such as five item picks per picker, and then by an average number of items per shipment. The per-picker allowance may be modified by expected productivity of each individual picker as determined by factors such as previous performance from that picker, the particular area the picker is working, the inherent difficulty of picking a particular item, or the travel distances required for a particular set of picks. The static limit is typically determined by multiplying the total number of chutes available for use in the sorter by a percentage, such as 95%, 100%, or 110%. In some cases, the facility modifies the static limit in accordance with the current average number of items per shipment. While the dynamic limit often varies during the course of picking, the static limit typically does not. The facility determines the current limit by selecting the smaller of the dynamic limit and the static limit.

In step 302, if the current number of open shipments is less than the current limit on open shipments determined in step 301, then the facility continues in step 303 to open an unopened shipment for picking, else these steps conclude. After shipment is opened, the items of the shipment become eligible to be picked in accordance with pick windows that are established for each item of the shipment. In step 303, the facility selects an unopened shipment to open. The facility may employ a variety of factors in the selection of step 303, including relative levels of importance attributed to various shipments, desired shipping times attributed to shipments, amount of time required to complete each shipment, etc.

In step 304, from the items of the shipment selected in step 303, the facility selects a first item to be picked. The facility may consider a number of factors in the selection of step 304. In some embodiments, the facility in step 304 selects the item of the selected order that, once picked, is expected to take the longest time to reach the sorter, such as by selecting the item of the selected order that is stored the largest distance from the sorter. In other embodiments, the facility employs other approaches to make the selection of step 304. In some embodiments, the facility bases selection of the first item on the location of the pickers who have the least to do, or the location of pickers who are about to leave a location that is infrequently visited by pickers. In step 305, the facility establishes a pick window for the first item selected in step 304. In some embodiments, the pick window established in step 305 begins at the present time. In other embodiments, the facility establishes the pick window at a future time when picker capacity is forecast to become available. In some embodiments, the facility establishes the pick window at the last possible moment to satisfy a shipping deadline for the shipment, thereby maximizing the number of first picks that can be made for location-based efficiency reasons.

Figure 4:
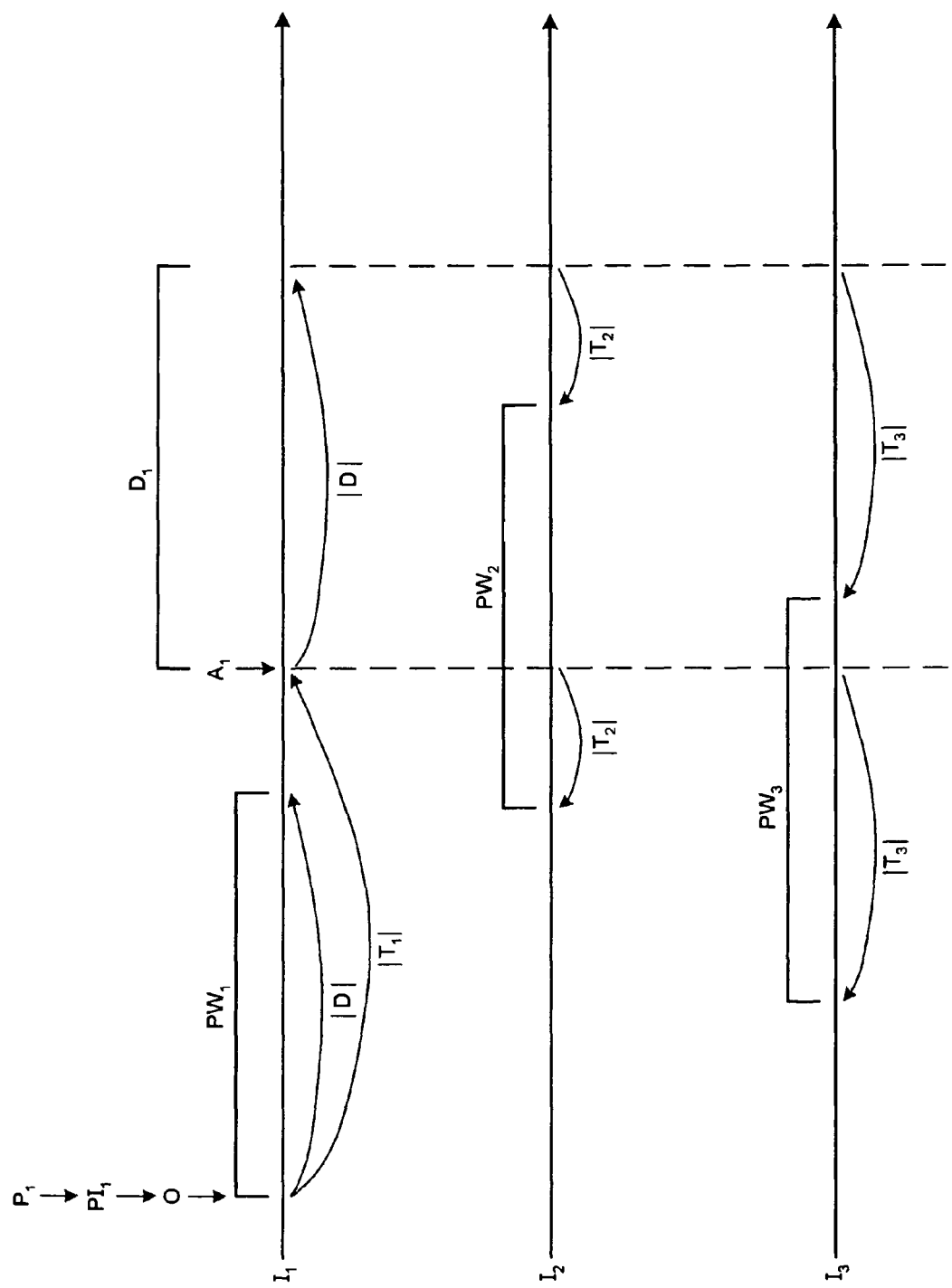
FIG. 4 is a timing diagram that shows the establishment of pick windows for items in a typical shipment.

FIG. 4 is a timing diagram that shows the establishment of pick windows for items in a typical shipment. In particular FIG. 4 shows the establishment of pick windows for a shipment containing 3 items, items $I_1$, $I_2$, and $I_3$. FIG. 4 contains a timeline for each of these three items. Time O, the earliest time depicted in FIG. 4, shows the time at which the shipment is opened. The facility establishes pick window $PW_1$ for item $I_1$. The pick window $PW_1$ begins at shipment opening time O and extends for a time equal to the target chute dwell duration, |D|. In some embodiments, the facility determines the target chute dwell duration by dividing the number of sorting machine chutes by the number of shipments to be processed by the sorting machine in an hour. In some cases, this quotient is further modified using such variables as the length of time that chutes will be ready to empty prior to their actually being emptied, the expected number of chutes disabled by mechanical or other problems, and other factors.

In step 306, the facility determines a chute dwell period for the selected shipment based upon the amount of time that the first item selected in step 304 is expected to take to reach a sorter chute after being picked. The chute dwell period is the time period that one or more items of the selected shipment are expected to occupy a sorter chute. Said differently, the chute dwell period is the time period between the arrival at a sorter chute of the first item in a shipment and the discharge of the completed shipment from the chute.

FIG. 4 shows the establishment of a chute dwell period D for the sample shipment. The dwell period D begins at a time obtained by adding the anticipated travel time for item $I_1$, $|T_1|$, to opening time O. $T_1$ and the other anticipated travel times used by the facility can include or exclude various scheduling components, including such scheduling components as time spent in the sorting machine reaching the appropriate chute; time spent on a system of conveyors that convey items to the sorting machine; picker travel time from item storage location to a conveyor; picker travel time from the location at which the picker receives picking instructions to the item storage location; and variability allowances for any or all of these scheduling components. The end time for dwell period D is obtained by adding the target chute dwell duration |D| to the dwell period starting time.

In steps 307-309, the facility loops through each subsequent item in the selected shipment; that is, each item in the selected shipment item other than the first item selected in step 304. In step 308, the facility determines a pick window for the subsequent item from the chute dwell period determined in step 306, using an anticipated travel time for the subsequent item. FIG. 4 shows the determination of a pick window for subsequent item $I_2$. In particular, FIG. 4 shows that the pick window established for item $I_2$, pick window $PW_2$, is determined by shifting dwell period D, corresponding to the vertical dashed lines, backwards in time by the anticipated travel time for item $I_2$, $|T_2|$.

In step 309, if additional subsequent items remain to be processed, the facility continues in step 307 to process the next subsequent item. For example, in the second iteration of step 308, the facility determines a pick window for item $I_3$, pick window $PW_3$. After step 309, the facility continues in step 302 to determine whether the number of open shipments is now at least as large as the current limit on open shipments, and, if not, repeat steps 303-309 until the number of open shipments is at least as large as the current limit on open shipments.

In some embodiments, after selecting a first item for the selected shipment in step 304, rather than establishing pick windows for all of the items of the selected shipment, the facility instead immediately issues a pick instruction for the first item selected in step 304. The facility then uses the time at which that pick instruction was issued ($PI_1$ in FIG. 4), or the time at which the first item is actually picked ($P_1$ in FIG. 4) to determine the dwell period for the selected shipment, and to determine the pick windows for the subsequent periods. Referring to FIG. 4, the facility determines the start time for dwell period D by adding, to either the pick instruction time $PI_1$ or the pick time $P_1$ the travel time for item $I_1$, $|T_1|$. This dwell period start time is also the expected arrival time for item $I_1$, expected arrival time $A_1$. The dwell time for the selected shipment is determined by adding the target dwell duration $|D|$ to the dwell period start time. The pick windows for the subsequent items are determined using the dwell period and the subsequent item travel times as described above.

Figure 5:
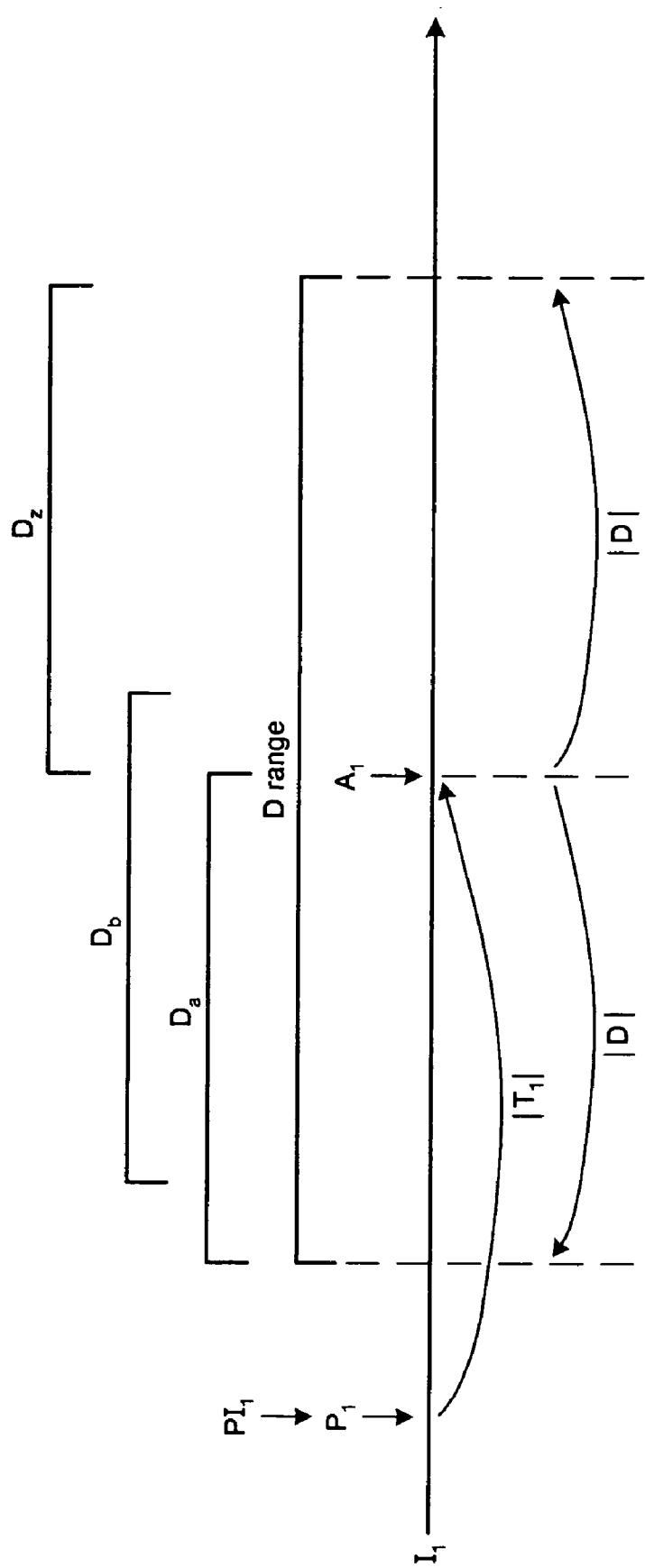
FIG. 5 is a timing diagram showing additional approaches to determining the dwell period for a shipment used by some embodiments of the facility.

FIG. 5 is a timing diagram showing additional approaches to determining the dwell period for a shipment used by some embodiments of the facility. FIG. 5 shows a timeline for an item $I_1$ selected as the first item for a shipment. The earliest time shown in FIG. 5 is either the time at which the pick instruction is issued for item $I_1$, pick instruction time $PI_1$, or the time at which item $I_1$ is actually picked, pick time $P_1$. The facility first adds to this earliest time, the anticipated travel time for $I_1$, $|T_1|$, to obtain an expected arrival time for item $I_1$, arrival time $A_1$. The facility proceeds to select one of a number of different dwell periods that fall within a possible range of dwell periods, $D_{range}$. Because item $I_1$ is expected to arrive at a sorter chute at time $A_1$, the facility should select a dwell period of the target duration that contains time $A_1$. The earliest such dwell period is dwell period $D_a$; the latest is dwell period $D_z$. The facility may also select any of a number of intermediate dwell periods, such as dwell period $D_b$. The beginning of the range in which the facility selects a dwell period is determined by subtracting the target dwell duration 101 from time $A_1$, and the end of the range is determined by adding the target dwell duration $|D|$ to time $A_1$.

Figure 6:
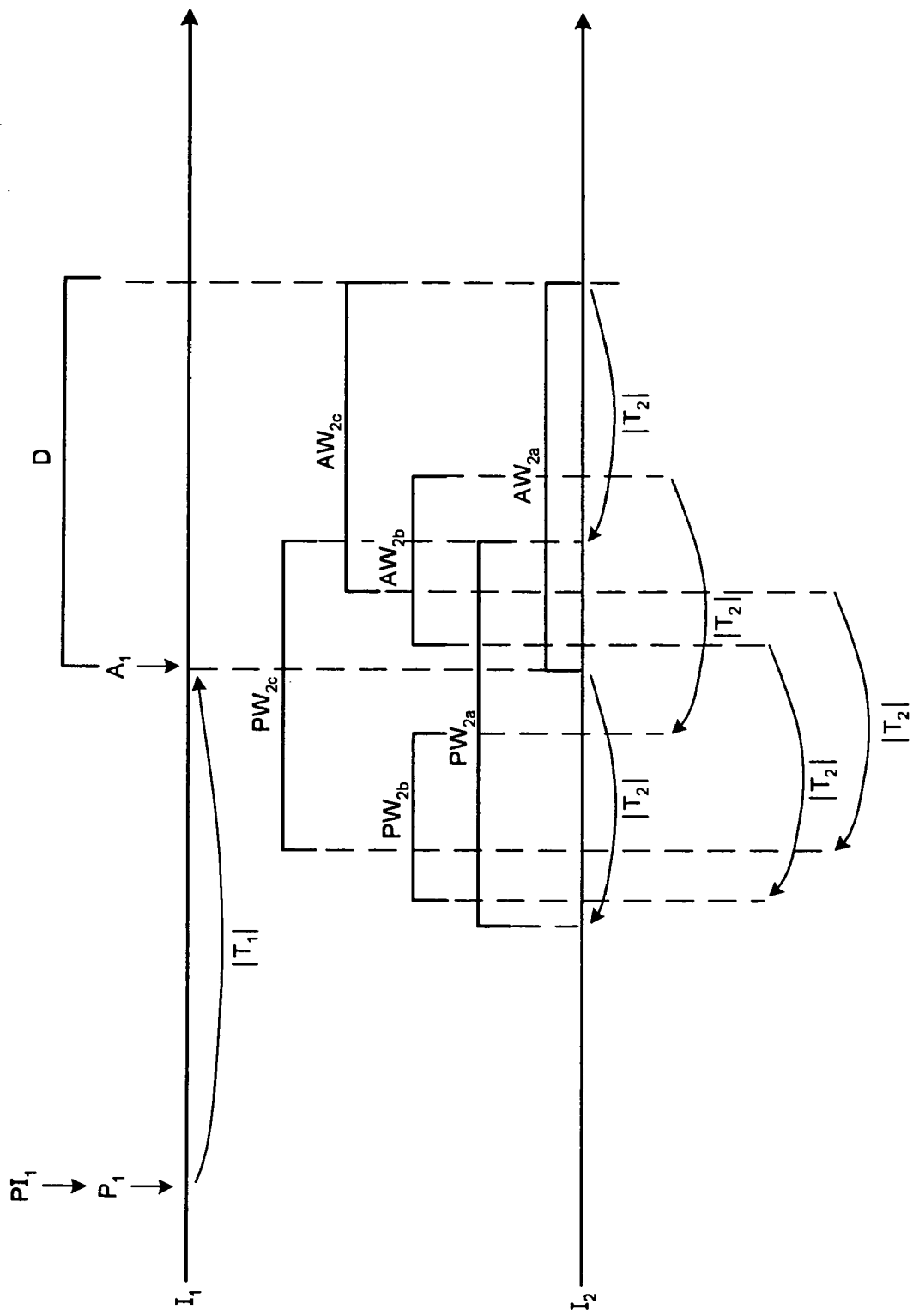
FIG. 6 is a timing diagram showing approaches used to select a pick window for a subsequent item by some embodiments of the facility.

FIG. 6 is a timing diagram showing approaches used to select a pick window for a subsequent item by some embodiments of the facility. FIG. 6 shows the selection of a dwell period D based upon the pick instruction time or pick time for first item, and the first item's anticipated travel time. In embodiments utilizing this approach, the facility establishes an arrival window for subsequent item $I_2$ specifying a period of time in which subsequent item $I_2$ is to arrive at the sorter, and uses this established arrival window to determine a pick window for this subsequent item. The arrival window can be any subrange of the dwell period. FIG. 6 shows three possible arrival windows for item $I_2$. The first possible arrival window for item $I_2$, arrival window $AW_{2a}$, is exactly coextensive with dwell period D. From this arrival window, the facility determines a pick window, pick window $PW_{2a}$, by subtracting the travel time for item $I_2$, $|T_2|$, from the beginning and end of arrival window $AW_{2a}$. The facility may select an arrival window that is shorter than dwell period D, such as arrival window $AW_{2b}$. The facility determines a pick window for arrival window $AW_{2b}$, pick window $PW_{2b}$, by adding anticipated travel time $|T_2|$ for item $I_2$ to the begin and end times for arrival window $AW_{2b}$. The facility may similarly select an arrival window located in various locations within dwell time D, such as arrival window $AW_{2c}$. Pick window $PW_{2c}$ for arrival window $AW_{2c}$ is determined in a similar manner.

Figure 7:
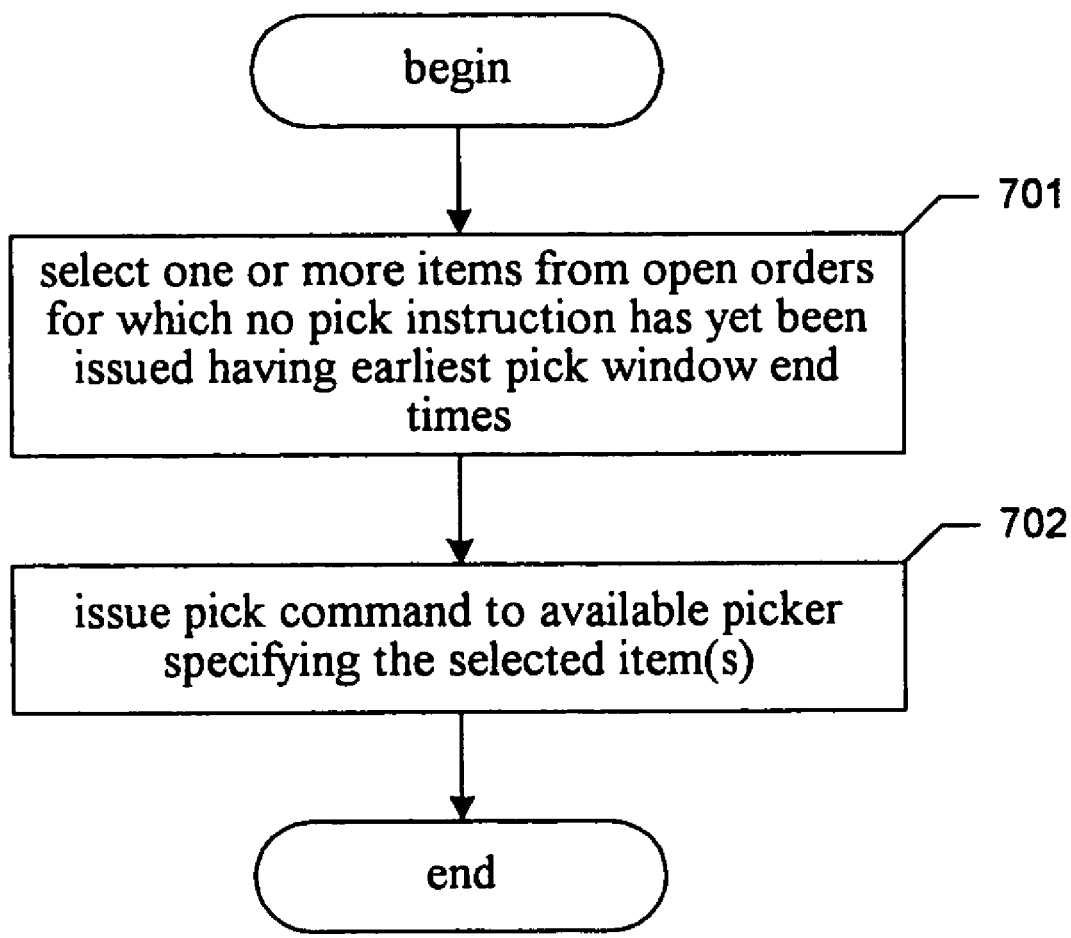
FIG. 7 is a flow diagram showing steps typically performed by the facility in order to generate a pick instruction for an available picker.

Once a pick window has been established for an item in an open order, that item becomes eligible to receive a pick instruction and be picked, based upon how its pick window relates in time to the pick windows of other unpicked items in open orders. FIG. 7 is a flow diagram showing steps typically performed by the facility in order to generate a pick instruction for an available picker. The facility typically performs the steps shown in FIG. 7 when a picker becomes available to receive a new pick instruction, such as when a picker begins work at the beginning of the day, completes an earlier pick instruction, returns from a break, etc. In step 701, the facility selects one or more items from open orders. The facility selects only items for which no pick instruction has yet been issued, and typically selects from all such items those having the earliest pick window end times. In some embodiments, the facility in step 701 selects items based upon a combination of each item's pick window status and location. In some embodiments, the facility compares each item's pick window to the current time in order to attribute one of a small number of discrete pick urgency levels to the item, and selects items based upon a combination of their pick urgency level and location. In some embodiments, the facility considers the location of pickers versus the location of the item as a factor in selection. In step 702, the facility issues a pick command to the available picker specifying the item or items selected in step 701. After step 702, these steps conclude.

Figure 8:
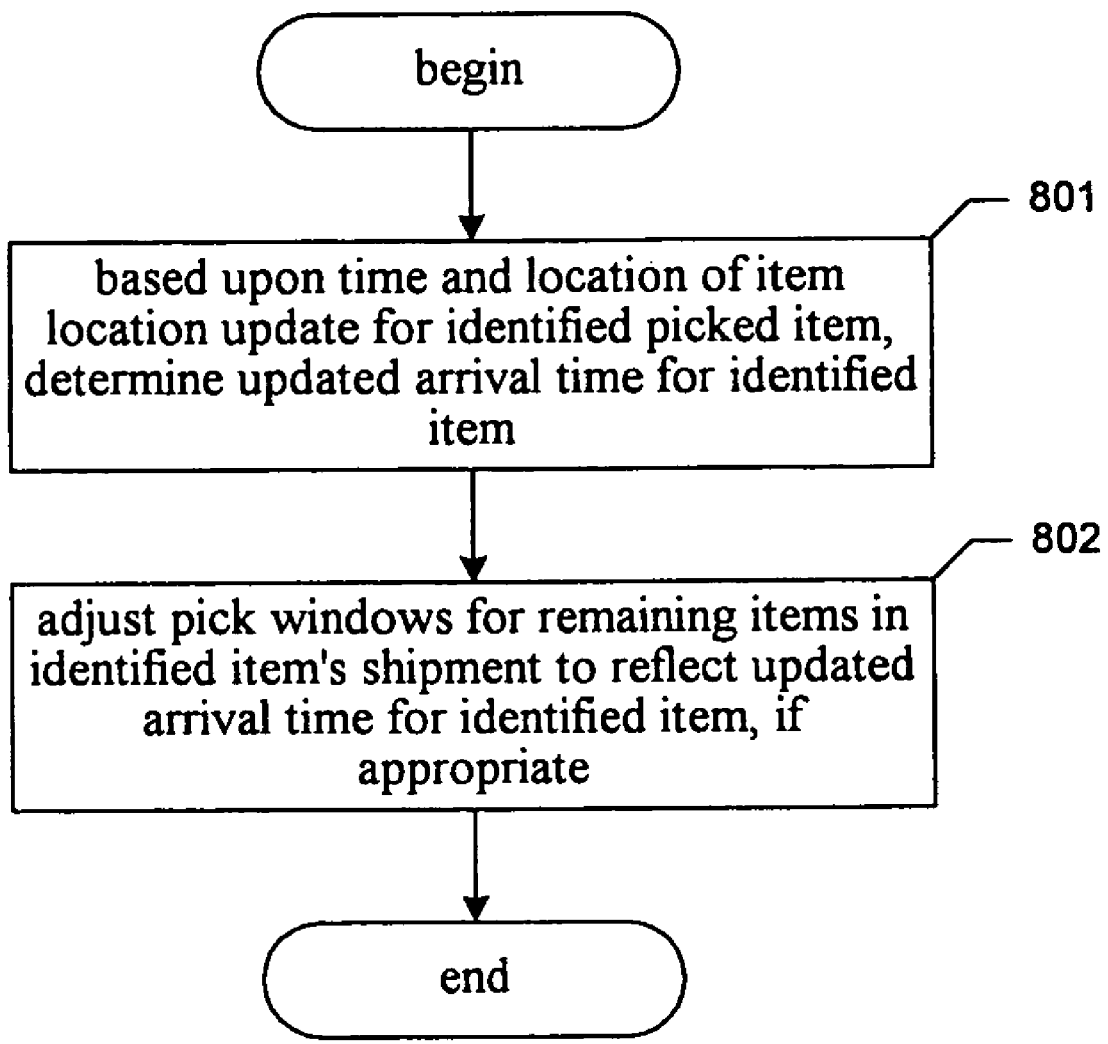
FIG. 8 is a flow diagram showing steps typically performed by the facility to update existing pick windows for items in a shipment in response to receiving new location information about an item in the shipment that has already been picked.

FIG. 8 is a flow diagram showing steps typically performed by the facility to update existing pick windows for items in a shipment in response to receiving new location information about an item in the shipment that has already been picked and is on its way to the sorter. These steps are typically performed by the facility each time an item location update is received for a picked item. An item location update typically specifies the identity of a picked item, a location at which the location was observed, and a time at which the item was observed at that location. The contents of an item location update may take various forms. For example, where item location updates are delivered in a real-time manner, the time specified by item location updates may be implicit. Item location updates may be generated by a device carried by a picker who is holding the item, or various sensing devices encountered by the item in its travel to the sorter 250. For example, bar code readers situated at points along the conveyors or inductors may generate item location updates, as may RFID sensors deployed in various locations within the distribution center.

In step 801, based upon the time and location specified by the received item location update, the facility determines an updated arrival time for the item identified in the item location update. For example, if items typically take 14 minutes to reach the sorter from a conveyor position at which a bar code scanner generating the item location update is located, the facility determines an updated arrival time for the identified item that is 22 minutes later than the time specified by the item location update. In step 802, the facility adjusts pick windows for the remaining items in the identified item's shipment (i.e., those items in the shipment that have not yet been picked) to reflect the updated arrival time for the identified item determined in step 801, if such adjustment is appropriate. The facility may omit to adjust these pick windows in step 802 if, for example, the updated arrival time is not outside the existing dwell period for the shipment—i.e., is not earlier than the dwell period start time nor later than the dwell period end time—or does not lie more than a threshold time from the closer end of the current dwell period. After step 802, these steps conclude.

Figure 9:
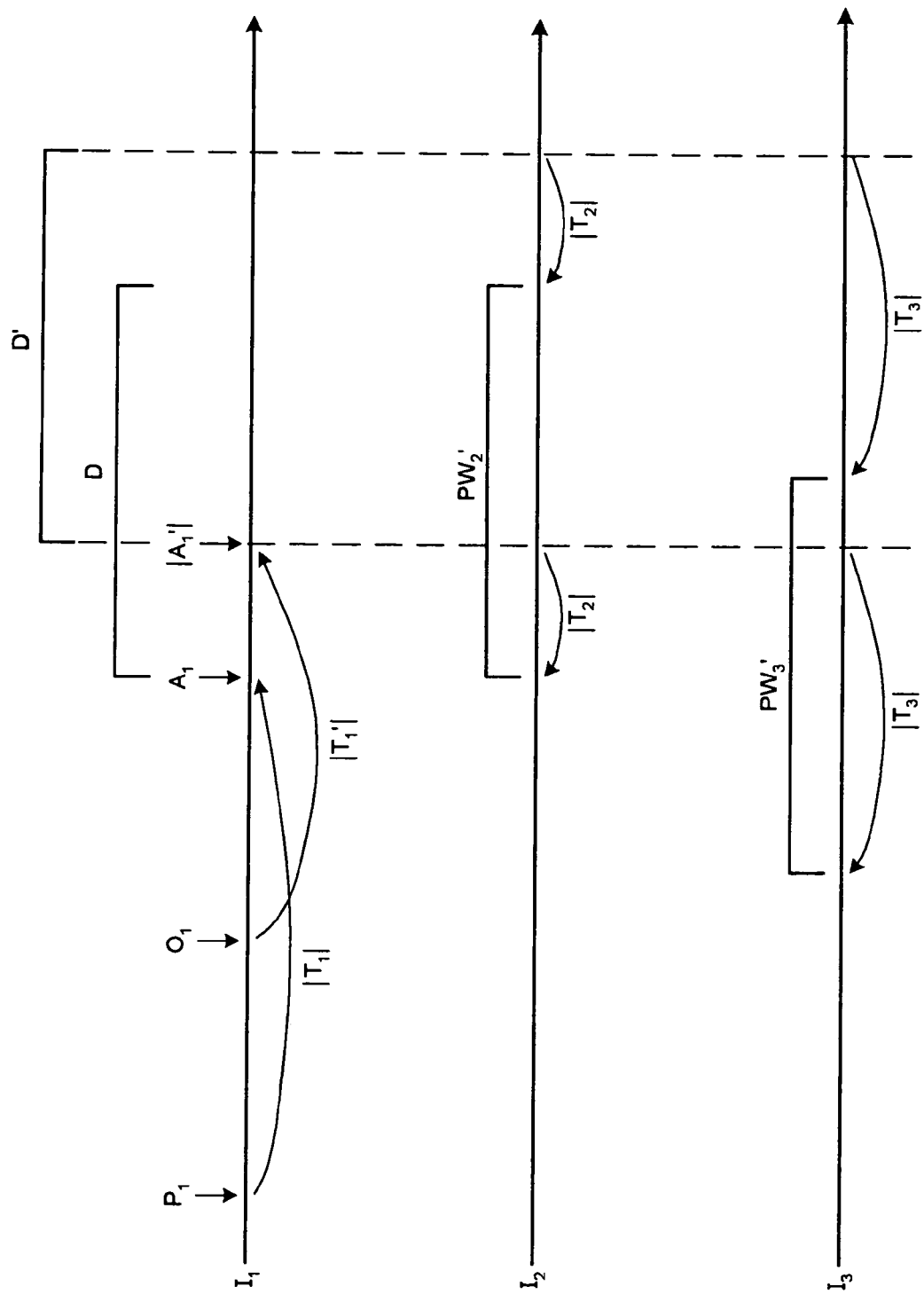
FIG. 9 is a timing diagram showing an example of updating existing pick windows for items in a shipment in response to receiving new location information about an item in the shipment that has already been picked.

FIG. 9 is a timing diagram showing an example of updating existing pick windows for items in a shipment in response to receiving new location information about an item in the shipment that has already been picked. In particular, FIG. 9 shows the adjustment of pick windows shown in FIG. 4. At a time $O_1$ after the shipment's first item $I_1$ is picked at time $P_1$, item $I_1$ is observed at a particular location on its way to the sorting machine. The facility uses an anticipated travel time $|T_1'|$ from the location at which item $I_1$ was observed to the sorting machine to identify a new expected arrival time $A_1'$ that is later than the original expected arrival time $A_1$ upon which the original dwell period D was predicated. Based on establishing the updated arrival time $A_1'$, the facility establishes updated dwell period D', which corresponds to the vertical broken lines appearing in FIG. 9. The facility further uses the updated dwell time D' together with expected travel times for remaining items $I_2$ and $I_3$ to establish updated pick windows $PW_2'$ and $PW_3'$ for these remaining items.

It will be appreciated by those skilled in the art that the above-described facility may be straightforwardly adapted or extended in various ways. For example, the facility may be used to schedule the arrival of items of virtually any type at an item assembly point of virtually any sort, for virtually any purpose, including purposes relating to item shipment, as well as purposes not relating to item shipment. The facility may use a variety of approaches to establishing and coordinating item pick windows and chute dwell periods. While the foregoing description makes reference to preferred embodiments, the scope of the invention is defined solely by the claims that follow and the elements recited therein.

We claim:

1. A computer-readable storage medium storing a program, wherein the program is computer-executable to:
   determine a pick window start time for an identified item that is to be picked, after which the identified item is to be picked, wherein determining the pick window start time comprises subtracting from an item assembly point residency start time an amount of time that the identified item is expected to take to travel to an item assembly point;
   determine a pick window end time for the identified item, before which the identified item is to be picked, wherein determining the pick window end time comprises subtracting from an item assembly point residency end time an amount of time that the identified item is expected to take to travel to the item assembly point; and
   issue a picking instruction to a picker for the identified item, wherein the picking instruction is issued according to the pick window start time and pick window end time.

2. The computer-readable storage medium of claim 1, wherein the program is further computer-executable to determine the item assembly point residency end time, wherein determining the item assembly point residency end time comprises adding a desired residency duration to the item assembly point residency start time.

3. The computer-readable storage medium of claim 1, wherein the program is further computer-executable to determine the item assembly point residency start time, wherein determining the item assembly point residency start time comprises adding to an actual picking time for a second item to be assembled with the identified item time an amount of time that the second item is expected to take to travel to the item assembly point.

4. The computer-readable storage medium of claim 1, wherein the program is further computer-executable to incorporate an amount of time that the identified item is expected to spend on a conveyor belt bound for the item assembly point into the subtracted amount of time that the identified item is expected to take to travel to the item assembly point.

5. The computer-readable storage medium of claim 1, wherein the item assembly point has at least one item assembly unit, and wherein the program is further computer-executable to incorporate an amount of time that the identified item is expected to spend in the item assembly point before arriving at the item assembly point's item assembly unit into the subtracted amount of time that the identified item is expected to take to travel to the item assembly point.

6. The computer-readable storage medium of claim 1, wherein the item assembly point has a plurality of item assembly units, and wherein the program is further computer-executable to incorporate an amount of time that the identified item is expected to spend in the item assembly point before arriving at a particular item assembly unit among the item assembly point's plurality into the subtracted amount of time that the identified item is expected to take to travel to the item assembly point.

7. The computer-readable storage medium of claim 1, wherein the item assembly point has a plurality of item assembly units, and wherein the program is further computer-executable to incorporate an average amount of time that the identified item is expected to spend in the item assembly point before arriving at any of the item assembly units among the item assembly point's plurality into the subtracted amount of time that the identified item is expected to take to travel to the item assembly point.

8. The computer-readable storage medium of claim 1, wherein the program is further computer-executable to incorporate an amount of time that the identified item is expected to take to reach a conveyor belt bound for the item assembly point into the subtracted amount of time that the identified item is expected to take to travel to the item assembly point.

9. The computer-readable storage medium of claim 1, wherein the program is further computer-executable to incorporate an amount of time that a picker is expected to take to reach the identified item into the subtracted amount of time that the identified item is expected to take to travel to the item assembly point.

10. A computer-readable storage medium storing a program, wherein the program is computer-executable to:
    generate a picking schedule data structure comprising, for each of two or more items specified for inclusion in the same shipment, information specifying a pick window start time, after which the item is to be picked, and a pick window end time, before which the item is to be picked, and wherein the picking schedule is generated such that each of the items, if picked within the pick window specified for it, will arrive at a common destination during a predetermined arrival window; and
    issue picking instructions to one or more pickers to pick the two or more items, wherein the picking instructions are issued according to the pick window start times and pick window end times included in the picking schedule data structure.

11. A computer-readable storage medium storing a program, wherein the program is computer-executable to:
    generate an item picking prioritization data structure comprising a plurality of entries, wherein each entry includes information identifying an item belonging to a shipment of items, and wherein to generate each entry, the program is further computer-executable to determine and store information identifying a time by which the identified item must be picked in order for the shipment of items to occupy a shipment aggregation unit for no more than a target amount of time; and
    issue picking instructions to one or more pickers to pick items identified in entries of the item picking prioritization data structure, wherein the picking instructions are issued according to the time by which each identified item must be picked in order for the shipment of items to occupy the shipment aggregation unit for no more than the target amount of time.

12. The computer-readable storage medium of claim 11, wherein for each entry, the program is further computer-executable to determine and store information identifying a time after which the identified item must be picked in order for the shipment of items to occupy a shipment aggregation unit for no more than a target amount of time.

13. The computer-readable storage medium of claim 11, wherein the program is further computer-executable to generate and store a plurality of groups of entries within the item picking prioritization structure, wherein each group of entries corresponds to a different shipment of items.

14. The computer-readable storage medium of claim 13, wherein the time identification information in a first group of entries identifies times by which the identified items must be picked in order for the shipment of items to occupy a shipment aggregation unit in a first location for no more than the target amount of time, and wherein the time identification information in a second group of entries identifies times by which the identified item must be picked in order for the shipment of items to occupy a shipment aggregation unit in a second location for no more than the target amount of time, wherein the second location is distinct from the first location.

15. A computer-readable storage medium storing a program, wherein the program is computer-executable to:

generate an item picking prioritization data structure comprising a plurality of entries, each entry comprising information identifying an item, the identified item having a pick window start time and a pick window end time, and wherein to generate each entry, the program is further computer-executable to determine and store information identifying a picking urgency level for the identified item; and issue picking instructions to one or more pickers to pick items identified in entries of the item picking prioritization data structure, wherein the picking instructions are issued according to the picking urgency levels indicated by the item picking prioritization data structure;

wherein to determine a picking urgency level for a given identified item, the program is further computer-executable to assign a first picking urgency level if the present time is later than the given identified item's pick window end time, to assign a second picking urgency level if the present time is later than the given identified item's pick window start time and earlier than the identified item's pick window end time, and to assign a third picking urgency level if the present time is earlier than the given identified item's pick window start time.

* * * * *